United States Patent
Chang et al.

(10) Patent No.: US 10,511,372 B2
(45) Date of Patent: Dec. 17, 2019

(54) SYSTEM AND METHOD FOR CHANNEL QUALITY REPORTING

(71) Applicant: INTEL IP CORPORATION, Santa Clara, CA (US)

(72) Inventors: Wenting Chang, Beijing (CN); Gang Xiong, Beaverton, OR (US); Yuan Zhu, Beijing (CN); Yushu Zhang, Beijing (CN); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/077,018

(22) PCT Filed: Jun. 29, 2016

(86) PCT No.: PCT/US2016/040163
§ 371 (c)(1),
(2) Date: Aug. 9, 2018

(87) PCT Pub. No.: WO2017/146765
PCT Pub. Date: Aug. 31, 2017

(65) Prior Publication Data
US 2019/0036584 A1    Jan. 31, 2019

Related U.S. Application Data

(60) Provisional application No. 62/299,922, filed on Feb. 25, 2016.

(51) Int. Cl.
*H04B 7/06* (2006.01)
*H04L 1/00* (2006.01)
(Continued)

(52) U.S. Cl.
CPC .......... *H04B 7/0626* (2013.01); *H04B 7/063* (2013.01); *H04B 7/0632* (2013.01);
(Continued)

(58) Field of Classification Search
CPC combination set(s) only.
See application file for complete search history.

(56) References Cited

U.S. PATENT DOCUMENTS 8,867,469 B2 * 10/2014 Han .................. H04L 5/001
370/329
9,167,467 B2 * 10/2015 Shimizu ............. H04L 5/0053
(Continued)

FOREIGN PATENT DOCUMENTS

| EP | 3360277 A1 * | 8/2018 | .......... H04L 5/0048 |
| WO | WO-2017146756 A1 * | 8/2017 | .............. H04L 1/18 |
| WO | WO-2017146765 A1 * | 8/2017 | ............ H04W 24/10 |

OTHER PUBLICATIONS

"Periodic CSI feedback enhancements for eCA" 3GPP TSG RAN WG1 Meeting #82bis, Malmo, Sweden, Oct. 5-9, 2015.
(Continued)

*Primary Examiner* — Berhanu Tadese
(74) *Attorney, Agent, or Firm* — Lowenstein Sandler LLP

(57) ABSTRACT

An apparatus of a user equipment (UE) may include a memory and one or more processors operatively coupled to the memory device. The processors determine a reporting mode for the UE based on a message received at the UE from an eNodeB. The UE may generate a channel state information (CSI) reporting message based on the determined reporting mode. The processors may also encode extra-large physical uplink control channel (xPUCCH) data including the CSI reporting message.

20 Claims, 5 Drawing Sheets

(51) Int. Cl.
*H04L 5/00* (2006.01)
*H04W 24/10* (2009.01)
*H04W 48/12* (2009.01)
*H04B 7/0456* (2017.01)

(52) U.S. Cl.
CPC ......... *H04B 7/0639* (2013.01); *H04L 1/0026* (2013.01); *H04L 1/0031* (2013.01); *H04L 5/0048* (2013.01); *H04W 24/10* (2013.01); *H04W 48/12* (2013.01); *H04B 7/0486* (2013.01); *H04L 1/0028* (2013.01)

(56) References Cited

U.S. PATENT DOCUMENTS

| | | | | |
|---|---|---|---|---|
| 9,215,050 B2* | 12/2015 | Seo | ........................ | H04L 1/0041 |
| 9,578,633 B2* | 2/2017 | Seo | ........................ | H04L 1/0041 |
| 9,686,777 B2* | 6/2017 | Han | ........................ | H04L 5/001 |
| 9,839,017 B2* | 12/2017 | Seo | ........................ | H04L 1/0041 |
| 9,877,309 B2* | 1/2018 | Seo | ........................ | H04L 1/0041 |
| 10,003,448 B2* | 6/2018 | Lee | ........................ | H04L 5/0048 |
| 10,193,608 B2* | 1/2019 | Park | ........................ | H04B 17/24 |
| 2004/0014429 A1* | 1/2004 | Guo | ........................ | H04B 7/0632 455/73 |
| 2010/0173639 A1* | 7/2010 | Li | ........................ | H04B 7/0695 455/450 |
| 2011/0141928 A1* | 6/2011 | Shin | ........................ | H04L 1/0028 370/252 |
| 2011/0317652 A1* | 12/2011 | Kim | ........................ | H04L 5/001 370/329 |
| 2012/0307760 A1* | 12/2012 | Han | ........................ | H04L 5/001 370/329 |
| 2014/0043979 A1* | 2/2014 | Etemad | ........................ | H04W 4/70 370/237 |
| 2014/0119310 A1* | 5/2014 | Shimizu | ........................ | H04L 5/0053 370/329 |
| 2014/0226608 A1* | 8/2014 | Seo | ........................ | H04L 1/0041 370/329 |
| 2014/0233517 A1* | 8/2014 | Seo | ........................ | H04L 1/0041 370/329 |
| 2014/0321416 A1* | 10/2014 | Pragada | ........................ | H04W 88/04 370/329 |
| 2014/0349694 A1* | 11/2014 | Raghothaman | ........................ | H04W 36/00 455/509 |
| 2015/0003379 A1* | 1/2015 | Han | ........................ | H04L 5/001 370/329 |
| 2015/0195818 A1* | 7/2015 | Davydov | ........................ | H04L 27/3494 370/329 |
| 2015/0244443 A1* | 8/2015 | Papasakellariou | .. | H04W 72/042 370/329 |
| 2015/0289282 A1* | 10/2015 | Phuyal | ........................ | H04W 76/14 370/329 |
| 2015/0351079 A1* | 12/2015 | Himayat | ........................ | H04W 28/08 370/329 |
| 2016/0073396 A1* | 3/2016 | Seo | ........................ | H04L 1/0041 370/329 |
| 2017/0135094 A1* | 5/2017 | Seo | ........................ | H04L 1/0041 |
| 2017/0164301 A1* | 6/2017 | Jeon | ........................ | H04W 52/283 |
| 2017/0170940 A1* | 6/2017 | Lee | ........................ | H04L 5/0048 |
| 2017/0201308 A1* | 7/2017 | Park | ........................ | H04B 17/24 |
| 2017/0207845 A1* | 7/2017 | Moon | ........................ | H04B 7/088 |
| 2017/0238309 A1* | 8/2017 | Han | ........................ | H04L 5/001 370/335 |
| 2017/0288763 A1* | 10/2017 | Yoo | ........................ | H01Q 3/10 |
| 2018/0063820 A1* | 3/2018 | Xiong | ........................ | H04W 72/042 |
| 2018/0103467 A1* | 4/2018 | Seo | ........................ | H04L 1/0041 |
| 2018/0110041 A1* | 4/2018 | Bendlin | ........................ | H04L 5/0007 |
| 2018/0124779 A1* | 5/2018 | Seo | ........................ | H04L 1/0041 |
| 2018/0206176 A1* | 7/2018 | Panteleev | ........................ | H04W 76/14 |
| 2018/0254851 A1* | 9/2018 | Roessel | ........................ | H04L 1/009 |
| 2018/0287765 A1* | 10/2018 | Lee | ........................ | H04L 5/0048 |
| 2018/0338254 A1* | 11/2018 | Ho | ........................ | H04W 24/10 |
| 2018/0343046 A1* | 11/2018 | Park | ........................ | H04W 76/27 |
| 2019/0036584 A1* | 1/2019 | Chang | ........................ | H04W 24/10 |
| 2019/0052343 A1* | 2/2019 | Li | ........................ | H04W 72/046 |

OTHER PUBLICATIONS

CSI types and reporting modes for Class B 3GPP TSG RAN WG1 Meeting #83, Anaheim, USA, Nov. 15-22, 2015.
International Search Report and Written Opinion dated Nov. 25, 2016, for application No. PCT/US2016/040163.

* cited by examiner

SYSTEM AND METHOD FOR CHANNEL QUALITY REPORTING

RELATED APPLICATIONS

This application claims the benefit of U.S. Provisional Patent Application No. 62/299,922, filed Feb. 25, 2016, which is hereby incorporated by reference herein.

BACKGROUND

The disclosure relates to the field of wireless communications, including reporting of channel information by user equipment.

BRIEF DESCRIPTION OF THE DRAWINGS

Various embodiments of the present disclosure will be understood more fully from the detailed description given below and from the accompanying drawings of various embodiments of the disclosure.

DESCRIPTION OF EMBODIMENTS

Figure 1:
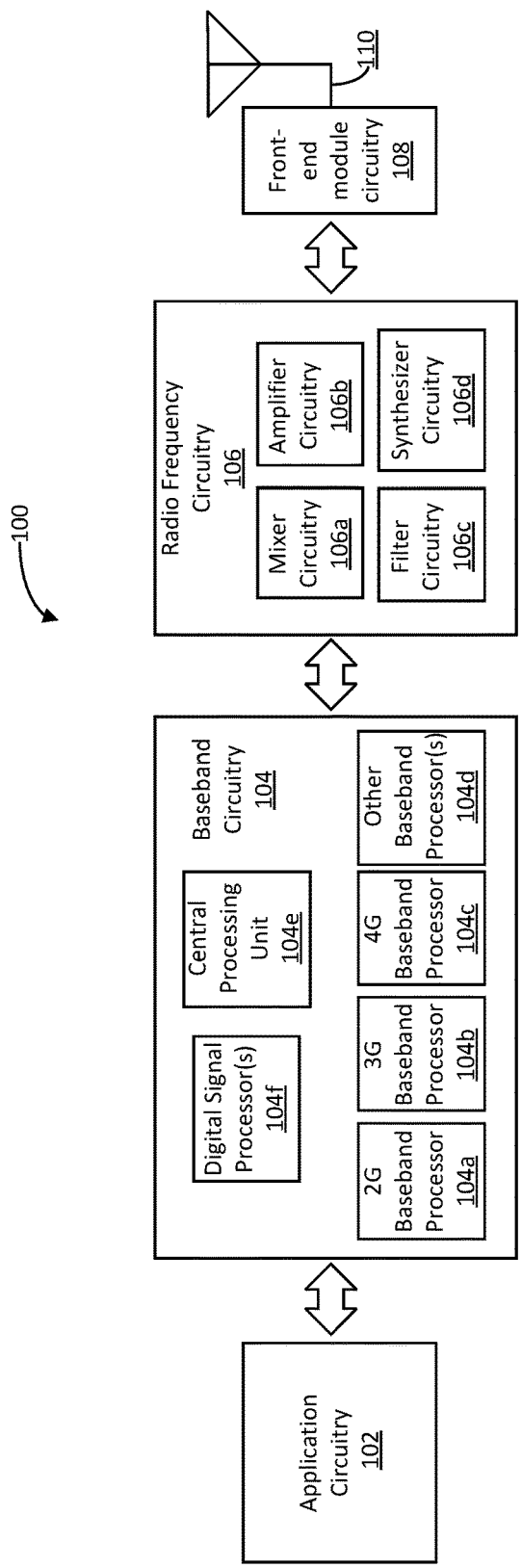
FIG. 1 is a block diagram illustrating components of an electronic device implementing aspects of the disclosure, according to an embodiment.

User equipment (UE) connected to a wireless network may report information to the network regarding the quality of communications received. For example, the UE may report back information that indicates the strength of a signal received from a base station. The information reported may be used by the base station to determine how to send information to the UE or to determine if a UE should be handed over to another base station. In long term evolution (LTE) systems, a UE may communicate with the network using one or more channels, carriers, or beams. In order to determine operating parameters for one or more UEs, the network may therefore benefit from additional channel state information. In order to efficiently transmit the channel state information to the network, the UE may transmit a reporting message over an extra-large physical uplink control channel (xPUCCH).

UEs connected to the network using multiple input and multiple output (MIMO) connections may report information regarding various channels used by the UE. In a MIMO system, the UE and the base station may each use multiple antennas to transmit and receive signals. The signals may then be received through several different channels. For example, in some embodiments a UE and a base station may each use 2 antennas for transmitting and receiving signals. In such a system, there are 4 channels through which the data may be transmit (e.g., from the first antenna of the transmitter to the first antenna of the receiver, from the first antenna of the transmitter to the second antenna of the receiver, from the second antenna of the transmitter to the first antenna of the receiver, or from the second antenna of the transmitter to the second antenna of the receiver). The UE may measure the quality of signals received through each of these channels.

In some embodiments, a base station may utilize multiple antennas to form beams to produce stronger signals to UEs connected to the network. For example, MIMO antenna systems forming beams may be applied in a 5G system to enhance the coverage and improve the spectrum efficiency. For example, a base station of the network in a MIMO system, such as an evolved nodeB (eNodeB), may maintain a number of Transmitting (Tx) and Receiving (Rx) beams. In order to coordinate the beams to provide various UEs with appropriate signals, the UE may need to report Channel State Information (CSI) as well as beam information to the network. For example, to report CSI, the UE may report a channel quality indicator (CQI) that indicates the quality of transmissions received by the UE, a precoding matrix indicator (PMI), a rank indicator (RI), and a beam index (BI). The beam information provided as feedback from the UE may contain a beam reference signal identification (BRSID) and a beam quality indicator (BQI). The eNodeB may use this feedback information provided by the UE to determine a modulation and coding scheme to use when sending transmissions to the UE.

In some embodiments, the UE may provide CSI feedback comprising more than one BQI and more than one CQI. The CQI may indicate the modulation and coding schemes used by the UE. The CQI may be based on a PMI and RI for the UE. In some embodiments, the CQI may be an integer value that indicates the quality of the channel. In response to receiving the CQI, the network may determine a coding rate and modulation scheme for transmitting signals to the UE. The PMI indicates which precoding matrix should be used by the network for communications. The PMI may be based on the RI, and may be selected from a codebook based on the RI. The codebook may be a stored set of PMI that is used by the UE and the network to determine coding and modulation schemes for transmissions. The RI may indicate a number of layers that the UE is using during decoding of downlink transmission. The beam information provided by the UE to the network may include BRSID that identifies which beam is being measured by the UE. The BRSID may be based on a number in a resource group provided by the network. The beam information may also include a BQI that is based on the power of the received beam. For example, the UE may measure the power of a signal received from an eNodeB for a particular beam and convert the power to a BQI value that represents the quality of the received signal.

In some embodiments, a UE may report more than one CQI and more than one BQI in a CSI report to the network in order to support flexible beamforming and dual beam operation. For example, reporting multiple beams may indicate which beam to use to communicate with the UE, how to use multiple beams to communicate with the UE, or how to direct a beam to target the UE.

The UE may report 5G Uplink Control Information (xUCI) including CSI and BRS-RP reports using an associated 5G physical uplink control channel (xPUCCH) in response to downlink control information (DCI) received from the eNodeB. For example, the DCI may include a xPUCCH reporting mode indicator that determines a reporting mode for the UE. In some embodiments, higher layer signaling may configure the UE for reporting according to a particular mode. For example, a MAC control element may configure the UE to provide particular information at a scheduled time to the network regarding CSI and BQI. The reports provided over the xPUCCH may be provided periodically according to a schedule set by the DCI or higher layer signaling.

In some embodiments, the UE may report CSI using the xPUCCH sub-frame n upon decoding DCI in the downlink sub-frame n on which the CSI report is triggered, where n indicates the ordinal number of sub-frame within its frame. For example, in an LTE network, the frame length is 10 ms. The frame may be split into 1 ms sub-frames that are numbered between 0 and 9 to indicate a position within the frame. The UE may decode DCI in a downlink sub-frame with a number n that is monitored by the UE for DCI. In response to decoding the DCI in downlink sub-frame n, the UE may determine that there is an indication of a trigger for a CSI report. The DCI may also indicate to the UE to report CSI using the xPUCCH in a corresponding uplink sub-frame n. In some embodiments, the DCI may indicate to the UE to report the CSI in a different sub-frame. Accordingly the CQI and BQI report may be associated with an active CSI reference signal (CSI-RS) process for the UE. For example, the CQI and BQI may be reported on an active CSI-RS schedule for reporting CSI to the eNodeB. The CSI report provided by the UE may be associated with one CSI-RS processes for the UE. In some embodiments, the network may not request more than one CQI or BQI in a CSI report from the UE. The contents of the report may be set by the DCI or higher level signaling to the UE. For example, the eNodeB may provide a xPUCCH reporting mode indicator to the UE that indicates a particular mode for the UE to report. In some embodiments, the eNodeB may provide individual indicators to indicate the number of CQI and BQIs to report. For example, the UE may receive a nCQI xPUCCH reporting indicator indicating the number of CQIs to including in a CSI report and nBQIs xPUCCH reporting indicator to indicate the number of BQIs to include in a CSI report. In some embodiments, the UE may operate to report CSI according to the modes described with reference to Table 1 below.

TABLE 1

| xPUCCH CSI Feedback Type | | CQI Feedback Type | | |
|---|---|---|---|---|
| | | No CQI | Single CQI | Multiple CQI |
| BQI Feedback Type | No BQI | | Mode 2-0 | Mode 3-0 |
| | Single BQI | Mode 1-1 | Mode 2-1 | Mode 3-1 |
| | Multiple BQI | Mode 1-2 | Mode 2-2 | Mode 3-2 |

The modes described in Table 1 may determine the type of feedback provided by the UE. As shown in the table, the UE may operate to report in three types of CQI feedback and three types of BQI feedback. The three types of BQI feedback may include reporting no BQI, reporting a single BQI, or reporting multiple BQIs. The three types of CQI feedback may include reporting no CQI, a single CQI, or multiple CQI. As discussed above, the network may set the reporting mode for the UE using DCI or higher layer signaling. Additionally, the UE may operate according to a default mode if no mode is set by the network.

Beginning with CSI feedback modes that do not have BQI feedback, the UE may operate in reporting mode 2-0 to report a single CQI or reporting mode 3-0 to report multiple CQI. In mode 2-0, the single CQI report may include PMI, RI, BI, and CQI for the received signal on the selected channel. In order to determine a value for the BI, the UE may access a set of CSI resource group (CRG) that is configured for use by the UE. The CRG may indicate the BI for a beam that the UE is to measure in view of a set of sub-bands that the UE is using. The RI may be based on a number of layers in the same set of sub-bands. The PMI may be selected from a codebook that is used by the UE to determine coding and modulation schemes for communications. The PMI maybe selected from the codebook based on the set of sub-bands used by the UE. The CQI value reported to the eNodeB may be a wideband CQI value based on the sub-bands used and the BI, RI, and PMI determined by the UE. In some embodiments, the UE may determine the values of BI, RI, PMI, and CQI using different or additional information or methods. The values reported according to other modes of transmission may be determined in a similar manner unless described differently below.

In mode 3-0, the UE may report similar information as in mode 2-0, but may report the information for multiple BIs used by the UE. For example, the UE may determine multiple BIs based on the corresponding CRGs used by the UE. The UE may then report PMI, RI, and CQI based on each of the selected BIs. Accordingly, the information provided in mode 2-0 is similar to that provided in mode 3-0, however, it is repeated for multiple BIs.

Moving on to CSI feedback modes that do not have CQI feedback, the UE may operate in modes 1-1 or 1-2 to report to the eNodeB. In mode 1-1 the UE provides information regarding information for a single beam, and in mode 1-2, the UE may provide beam information for multiple beams. For example, in mode 1-1, the UE may generate a single reporting message that contains a BRSID and BQI for a single beam. The BRSID may be determined from the beam reference signals BRSs of beams received by the UE. The UE may then report a wideband BQI value based on the signal strength of sub-bands in the transmission beam corresponding to the BRSID.

In mode 1-2, the UE may generate a single reporting message that contains BRSID and BQI values for multiple beams. The BRSID and BQI values may be calculated in the same or a similar manner as with reference to mode 1-1. The CSI report may comprise information for each of the BQI and BRSID values in a single message sent to the eNodeB over a xPUCCH at a scheduled time.

The remaining modes may provide a combination of values similar to those described with reference to modes 2-0, 3-0, 1-1, and 1-2. For example, mode 2-1 may include the CQI values as described with reference to mode 2-0 and the BQI values as described with reference to mode 1-1. Mode 3-1 may include the CQI values as described with reference to mode 3-0 and the BQI values as described with reference to mode 1-1. Mode 2-2 may include the CQI values as described with reference to mode 2-0 and the BQI values as described with reference to mode 1-2. Mode 3-2 may include the CQI values as described with reference to mode 3-0 and the BQI values as described with reference to mode 1-2. In mode 2-1, mode 3-1, mode 2-2, and mode 3-2 the reports may concatenate the values of each of the CQI(s) and BQI(s) reported into a single message for transmission during a scheduled time over a xPUCCH. In some embodiments, one or more of the CQI or BQI values may be transmit in separate messages over a xPUCCH.

In reporting CQI values for wideband and respective sub-bands, the UE may encode the sub-band CQI using a 2 bit sub-band differential CQI offset level. The offset level may be set as the sub-band CQI index minus the wideband CQI index. An example mapping from the differential CQI value to the offset level may be given by table 2 below. In some embodiments, the mapping may be set differently.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the disclosure. However, various aspects of the disclosed embodiments may be practiced in other examples that depart from these specific details. In certain instances, descriptions of well-known devices, circuits, and methods are omitted so as not to obscure the description of the present disclosure with unnecessary detail.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a UE device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuity 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), preceding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry may generate reports of CSI to transmit to the network as instructed. For example, the baseband circuitry may generate a CSI report including CQI, PMI, RI, BI, or other information regarding the quality of communications for a channel. The baseband circuitry may also generate a report of beam information including BRSID and BQI or other information regarding the quality of communications for a beam. Such reports may be encoded by the baseband circuitry and provided through RF circuitry for transmission to the network over xPUCCH. In some embodiments, the baseband circuitry may also process signals received from the network to determine how to report channel or beam information to the network. For example, the baseband circuitry may process signals instructing the UE which information to include in a report based on a mode provided by the network.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. For example, in some embodiments, the baseband circuitry may encode a MAC CE with BRS-RP information and CSI information for reporting to an associated eNodeB. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110).

In some embodiments, the UE device 100 may include additional elements such as, for example, memory/storage, display, camera, sensor, and/or input/output (I/O) interface.

Figure 2:
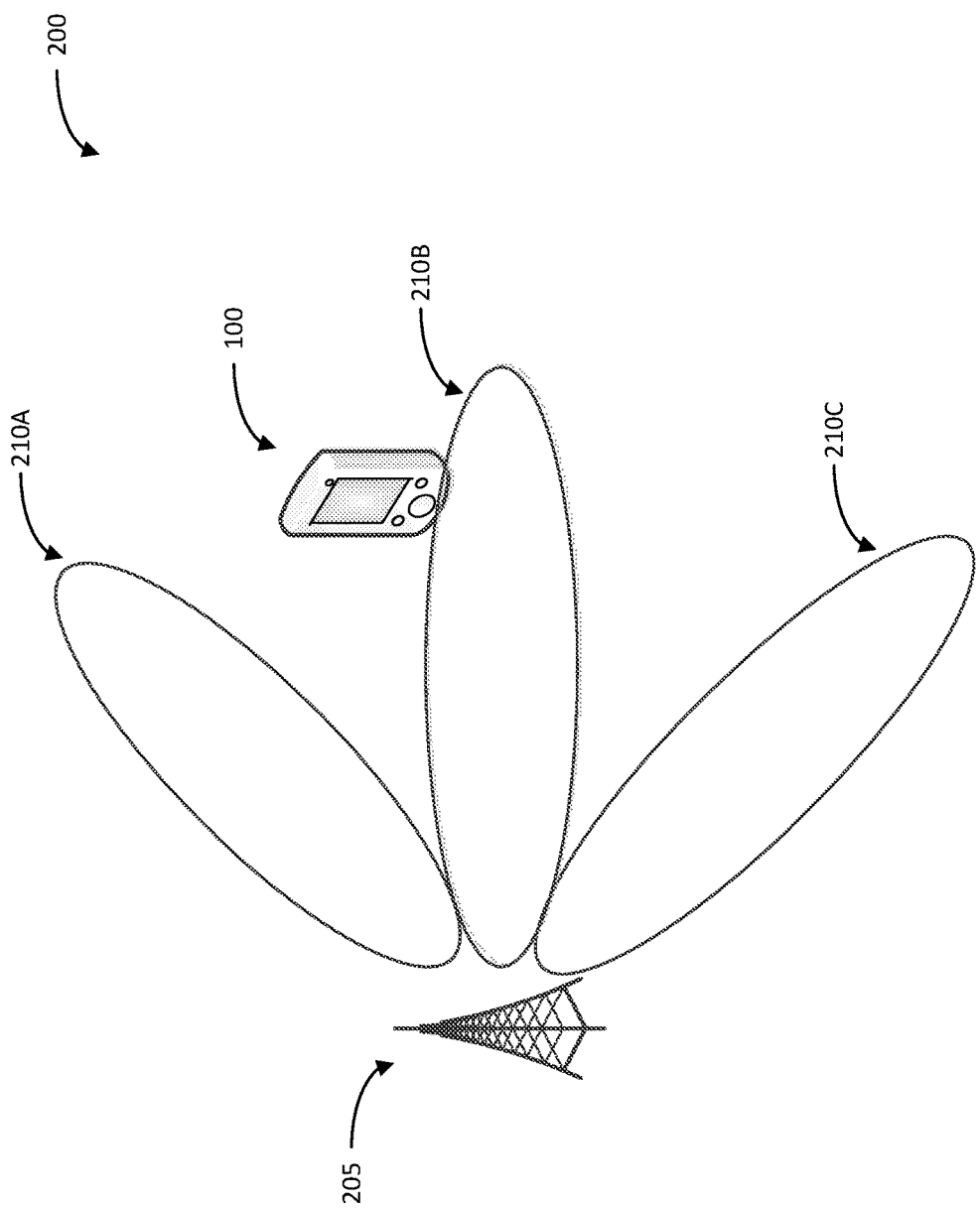
FIG. 2 is a block diagram illustrating components of a network, according to an embodiment.

FIG. 2 illustrates an example network environment 200 according to an embodiment. The network environment 200 may include a UE 100 as described above with reference to FIG. 1. The UE 100 may communicate with a network through an eNodeB 205. As shown in FIG. 2, the eNodeB 205 may communicate with the UE 100 through signals over one or more transmission beams 210A-210C. The beams may be formed by the eNodeB 205 in order to improve transmission power to UEs connected to the network. The eNodeB 205 may form the beams using multiple antennas in a MIMO antenna system. In order to produce a beam in a particular direction, the eNodeB 205 may delay transmission to one antenna of a pair of antennas. The delay may cause the signals produced by the pair of antenna to constructively interfere in one direction, and destructively interfere in other directions. In some embodiments, there may be multiple pairs of antennas to produce beams in different directions. The different beams may then be used to spatially multiplex signals transmit by the base station to different UEs. For instance, some UEs may connect to the network through beam 210A, while others may connect through beam 210B or 210C.

In order to provide feedback on the strength of signals received by UE 100 that is communicating with eNodeB 205, the UE may transmit one or more indications of the quality of signals received. For example, the UE may provide an indication of the strength of the signal received from one or more beams provided by the network. Accordingly, the UE 100 may measure the strength of signals received from the eNodeB 205, as well as measuring other indications of quality such as signal to noise ratio.

Based on the CSI received from the UE 100, the eNodeB 205 may modify the modulation and coding schemes used to communicate with the UE 100. For example, if the UE 100 reports high quality channel information, the eNodeB 205 may transmit downlink information to the UE 100 with more efficient encoding and modulation. On the other hand, if the UE reports low quality channel information, the eNodeB 205 may transmit downlink information with slower encoding and modulation, but in a manner that improves the error rate for the communications. In systems with beams 210A-210C, the UE may provide beam information in addition to general channel information to provide additional information to the network about the quality of signals received by the UE.

Figure 3:
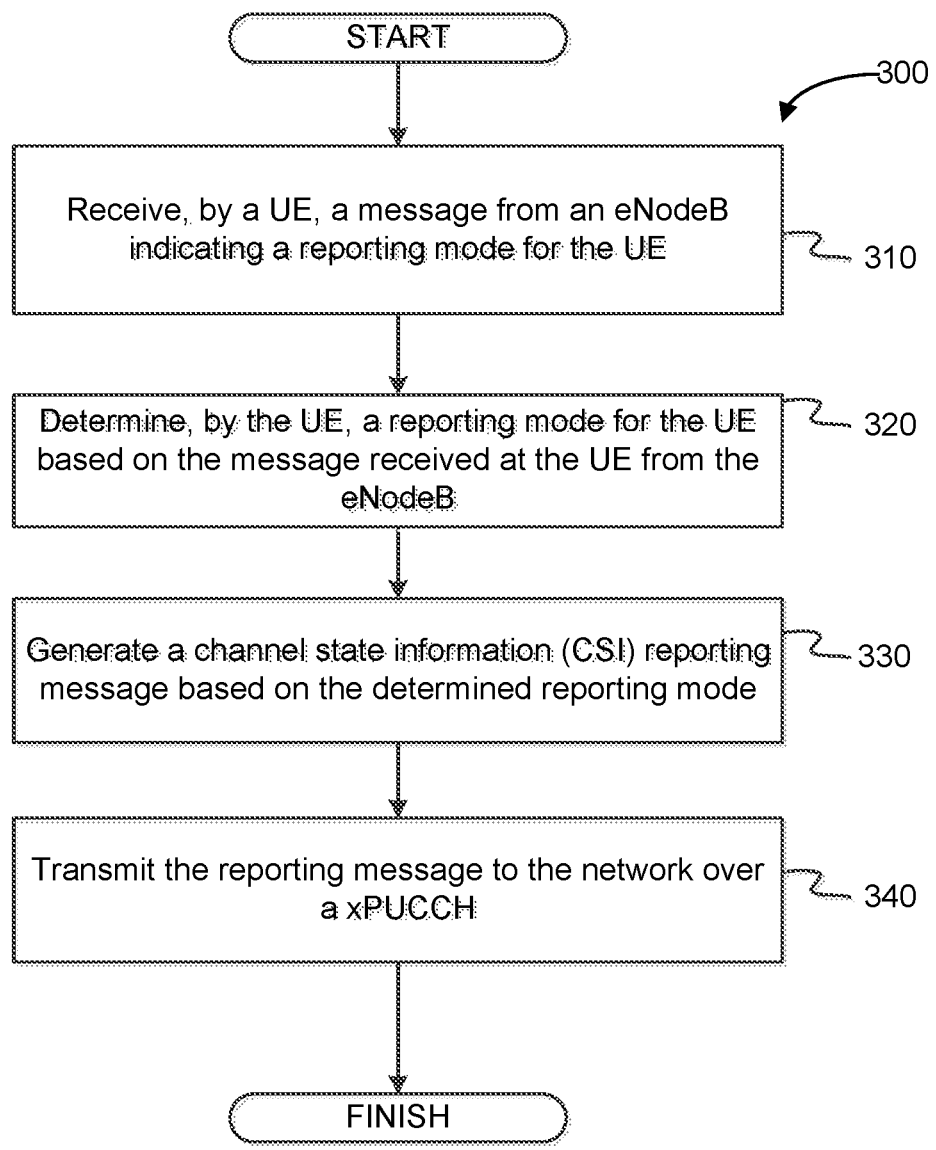
FIG. 3 is a flowchart illustrating an example method of performing channel quality reporting, according to an embodiment.

FIG. 3 is a flow chart 300 illustrating processes performed by a UE to report CSI information to a network. Beginning in block 310, the UE receives a message from an eNodeB indicating a reporting mode for the UE. The eNodeB may transmit the message to the UE based on communications received from an evolved packet core (EPC). For example, an EPC may provide messages or instructions to the eNodeB to send to a UE device. For example, in some embodiments, a mobility management entity (MME) of the EPC may provide instructions to the eNodeB over an x2 interface. The eNodeB may generate or send message to the UE based on the instructions. The message received at the UE may be DCI provided over a xPUCCH channel, or may be higher layer signaling such as MAC layer signaling.

In block 320, the UE may determine a reporting mode for CSI reporting based on the message received by the UE from the eNodeB. In some embodiments, the message to the UE may explicitly provide a mode for the UE to use for reporting. For example, using the example modes provided in Table 1, the message may include an indication of which of the modes the UE is to operate. In some embodiments, the message may comprise multiple elements that the UE uses to determine an operating mode. For example, the message may include an nCQI xPUCCH reporting indicator that indicates the number of CQIs to report and an nBQI xPUCCH reporting indicator that indicates the number of BQIs to report. The UE may use the reporting indicators to determine which reporting mode to operate.

In block 330, the UE generates a CSI reporting message based on the determined reporting mode. For example, the UE may measure the signal strength of a channel to determine the CQI for the channel. The UE may also measure the signal strength of a beam to determine a BQI. The UE may generate a CQI report for the channel based on the CQI that includes CQI, PMI, RI, and Bi. The UE may also generate a BQI report for the measured beam that includes a BRSID and BQI for the channel. Depending on the mode determined in block 320, generating the message may include generating a zero, one, or multiple CQI reports and generating zero, one, or multiple BQI reports. The BQI reports and CQI reports generated based on measured signal strengths may be combined into a single CSI reporting message. For example, in some embodiments, the messages may be concatenated into a single CSI reporting message for transmission to the network. In some embodiments, the UE may transmit the BQI reports or CQI reports separately to the network.

In block 340 the UE transmits the CSI reporting message to the network over xPUCCH. In some embodiments, the scheduling for transmitting the reporting message over a xPUCCH may be set by DCI received by the UE. In some embodiments, scheduling for the xPUCCH may be set by higher layer signaling such as MAC signaling. Generating and transmitting CSI reporting messages to the network by the UE may be performed periodically on the xPUCCH. For example, the scheduling information may indicate a time and frequency to generate and sent CSI reporting messages. In some embodiments, the UE may not repeat the steps of receiving a message indicating a reporting mode and determining a reporting mode described with reference to FIG. 3. Instead, the UE may generate and transmit messages to the network according to a schedule and in a determined mode until the UE receives updated instructions from the network.

Figure 4:
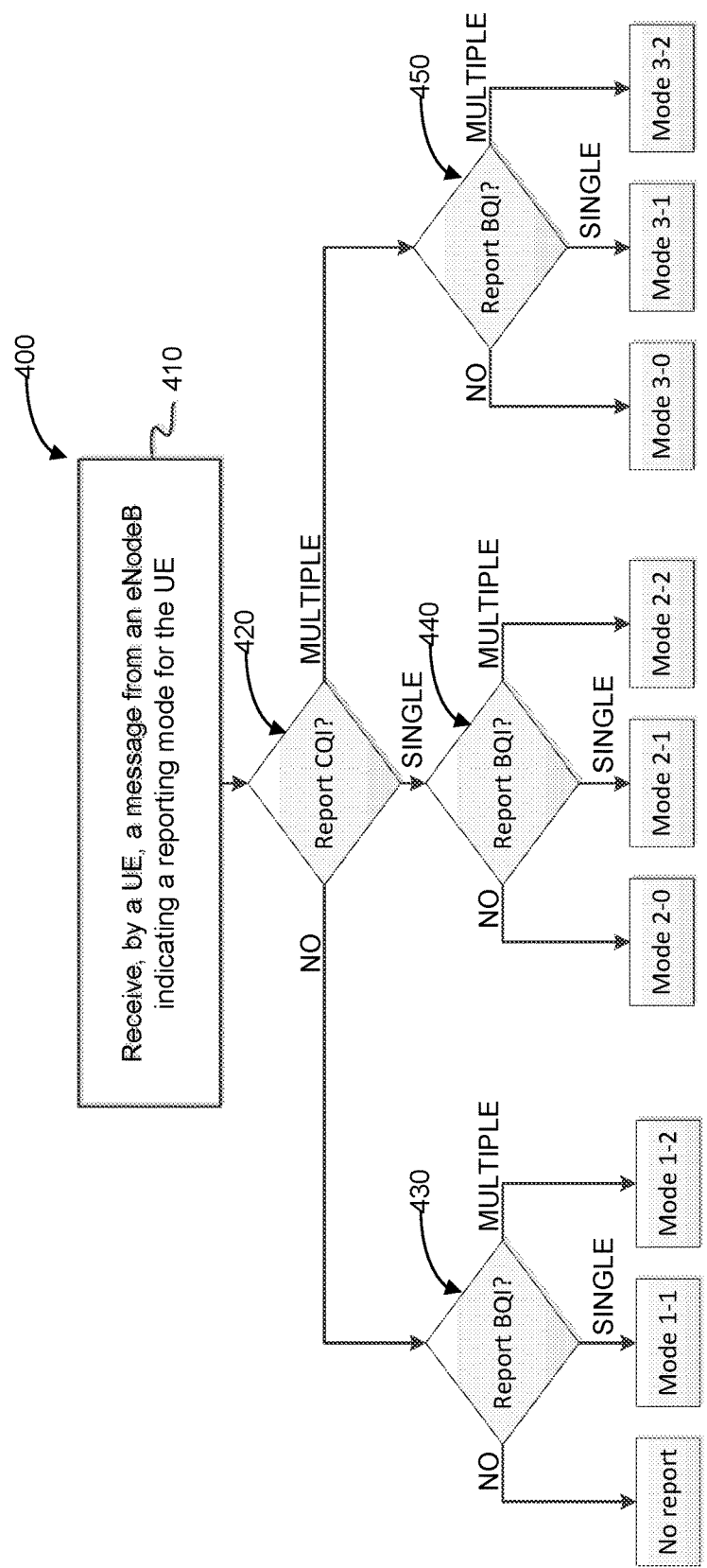
FIG. 4 is a flowchart illustrating example processes of determining a reporting mode for a UE, according to an embodiment.

FIG. 4 is a flow chart illustrating processes performed by a UE to determine a reporting mode, according to an embodiment. For example, the processes may be performed as part of block 320 of FIG. 3. Beginning in block 410, the UE receives a message from an eNodeB indicating a reporting mode for the UE. In block 420, the UE determines whether the message includes an indicator to report CQI to the network. The UE may determine that the message indicates to send a single CQI report, multiple CQI reports, or no CQI reports. If the UE determines that no CQI reports are to be sent, in block 430 the UE determines whether to report a BQI. The UE may determine that the message indicates to send a single BQI report, multiple BQI reports, or no BQI reports. If the UE determines in block 430 to send no BQI reports, then the UE is not set to a reporting mode. If the UE determines to send a single BQI report in block 430, the UE is set to mode 1-1. If the UE determines to send multiple BQI in block 430, the UE is set to mode 1-2.

If the UE determines in block 420 to send a single CQI report, then in block 440 the UE determines whether to report a BQI. The UE may determine that the message indicates to send a single BQI report, multiple BQI reports, or no BQI reports. If the UE determines in block 440 to send no BQI reports, then the UE is set to reporting mode 2-0. If the UE determines to send a single BQI report in block 440, the UE is set to mode 2-1. If the UE determines to send multiple BQI in block 440, the UE is set to mode 2-2.

If the UE determines in block 420 to send a single CQI report, then in block 450 the UE determines whether to report a BQI. The UE may determine that the message indicates to send a single BQI report, multiple BQI reports, or no BQI reports. If the UE determines in block 450 to send no BQI reports, then the UE is set to reporting mode 3-0. If the UE determines to send a single BQI report in block 450, the UE is set to mode 3-1. If the UE determines to send multiple BQI in block 450, the UE is set to mode 3-2. The result of the process in FIG. 4 may then be stored in baseband circuitry of the UE to set the mode for generating and transmitting CSI reports to the network. In some embodiments, the process may be repeated as additional messages are received from the network that update one or more parameters indicating the number of BQI or CQI reports to generate and send to the network.

Figure 5:
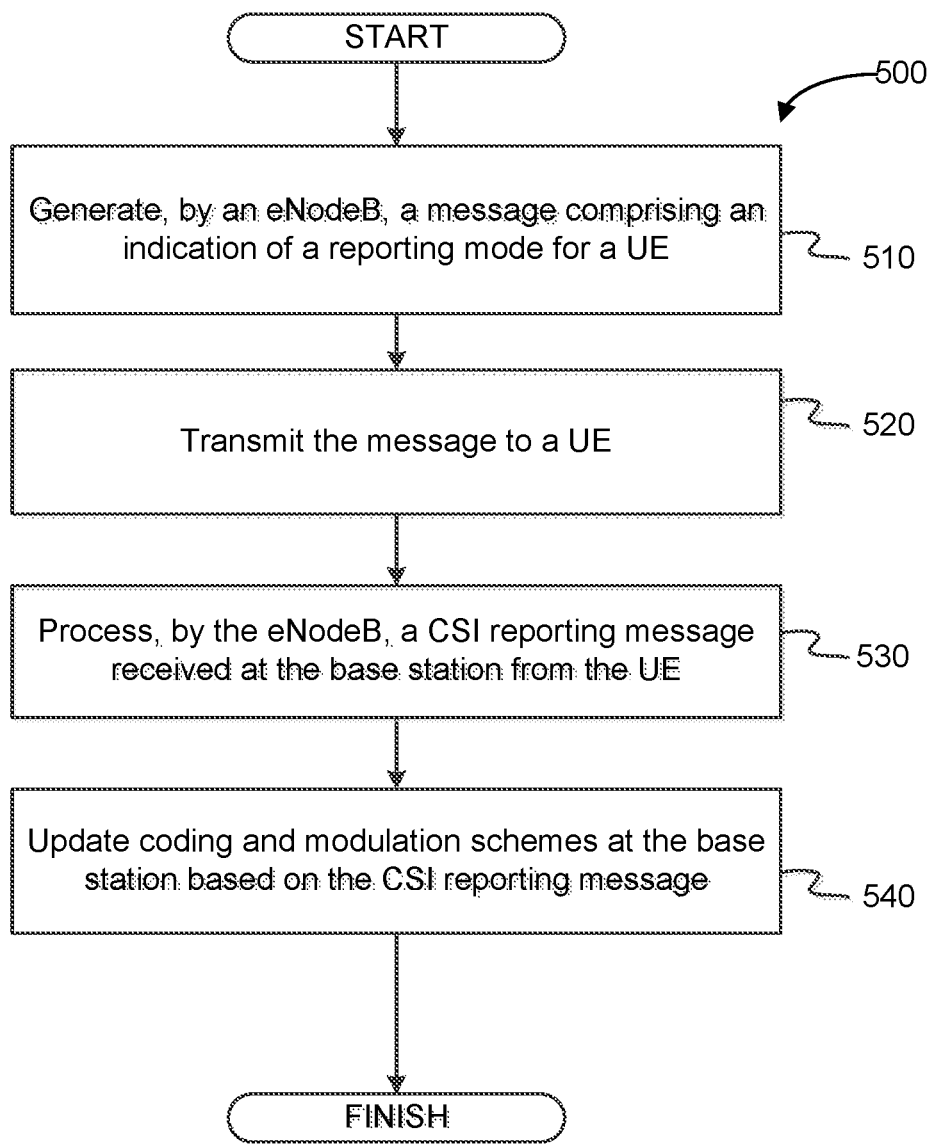
FIG. 5 is a flowchart illustrating an example method of performing channel quality reporting, according to an embodiment.

FIG. 5 is a flow chart illustrating processes performed by an eNodeB to request beam information from a UE. Beginning in block 510, the eNodeB generates a message comprising an indication of a reporting mode for a UE. The indication of the reporting mode may be a DCI message or a higher layer message. In some embodiments an EPC associated with the eNodeB may provide the message to the eNodeB or provide instructions to the eNodeB to send the message to the UE.

In block 520, the eNodeB transmits the message to the UE. The message sent by the eNodeB may include scheduling information for the UE. For example, DCI sent in a message by the eNodeB may include a sub-frame on which to provide a CSI reporting message to the eNodeB. Upon receiving the message, the UE may generate a feedback report to the eNodeB based on the instructions. The eNodeB may receive the feedback information in block 530. For example, the eNodeB may receive the CSI reporting message comprising one or more CQI reports or BQI reports. Baseband circuitry of the eNodeB may process the received feedback information to determine the information provided by the UE. In some embodiments, processing of the CSI reporting message may be processed by an EPC associated with the eNodeB.

In block 540, the eNodeB may update the coding and modulation schemes at the base station based on the BQI or CQI contained in the CSI reporting message. For example, if the UE reports an increasing strength of the BQI or CQI, the eNodeB may increase the speed of transmission. On the other hand, if the UE reports decreasing signal strength, the eNodeB may decrease the modulation and code rate used to transmit data. In addition to changing the modulation and code scheme used for transmission to the eNodeB, the eNodeB may update other parameters to improve performance of the eNodeB or the UE.

While the present disclosure describes a number of embodiments, those skilled in the art will appreciate numerous modifications and variations therefrom. It is intended that the appended claims cover all such modifications and variations as fall within the true spirit and scope of this present disclosure.

The following examples pertain to further embodiments of the disclosure.

Example 1 is an apparatus of a user equipment (UE) comprising: a memory; and one or more processors operatively coupled to the memory device to: determine a reporting mode for the UE based on a message received at the UE from an eNodeB; generate a channel state information (CSI) reporting message based on the determined reporting mode; and encode extra-large physical uplink control channel (xPUCCH) data to include the CSI reporting message In Example 2, in the apparatus of example 1, or any of the examples described herein, the message received by the UE comprises downlink control information (DCI) and wherein the processors are to determine the reporting mode based on a reporting mode indicator included in the DCI.

In Example 3, in the apparatus of example 1, or any of the examples described herein, the processors are further to determine an uplink sub-frame for the CSI reporting message, the uplink sub-frame having an ordinal number corresponding to an ordinal number of a downlink sub-frame carrying the DCI.

In Example 4, in the apparatus of example 1, or any of the examples described herein, the message received at the UE from the eNodeB comprises a high layer configuration message.

In Example 5, in the apparatus of example 1, or any of the examples described herein, the CSI reporting message comprises a channel quality indicator (CQI) report comprising one or more of a precoding matrix indicator (PMI), a rank indicator (RI), a beam index (BI), or a channel quality indicator (CQI).

In Example 6, in the apparatus of example 1, or any of the examples described herein, the CSI reporting message comprises a beam quality indicator (BQI) report comprising one or more of a beam reference signal identifier (BRSID) or a beam quality indicator (BQI).

In Example 7, in the apparatus of example 1, or any of the examples described herein, in response to determining that the reporting mode is a first mode, to generate the CSI reporting message the processors are to: determine a wideband CQI value based for a BI; determine a wideband BQI value for a BRSID; and generate the CSI reporting message comprising the wideband CQI value and the wideband BQI value.

In Example 8, in the apparatus of example 1, or any of the examples described herein, in response to determining that the reporting mode is a second mode, to generate the CSI reporting message the processors are to: determine a first CQI value for a first BI and a second CQI value for a second BI; determine a BQI value for a BRSID; and generate the CSI reporting message comprising the first CQI value, the second CQI value, and the BQI value.

In Example 9, in the apparatus of example 1, or any of the examples described herein, in response to determining that the reporting mode is a third mode, to generate the CSI reporting message the processors are to: determine a first CQI value for a first BI and a second CQI value for a second BI; determine a first BQI value for a first BRSID and a second BQI for a second BRSID; and generate the CSI reporting message comprising the first CQI value, the second CQI value, the first BQI value, and the second BQI value.

In Example 10, in the apparatus of example 1, or any of the examples described herein, in response to determining that the reporting mode is a fourth mode, to generate the CSI reporting message the processors are to: determine a CQI value for a BI; determine a first BQI value for a first BRSID and a second BQI for a second BRSID; and generate the CSI reporting message comprising the CQI value, the first CQI value, and the second CQI value.

In Example 11, in the apparatus of example 1, or any of the examples described herein, to determine the reporting mode for the UE, the processors are to determine a number of CQI values to report and a number of BQI values to report.

In Example 12, the apparatus of example 1, or any of the examples described herein, further comprises radio frequency (RF) circuitry coupled to the processors; front-end module circuitry coupled to the RF circuitry; and an antenna coupled to the front-end module circuitry, wherein to cause the reporting message to be transmitted over a xPUCCH, the processor are to to encode the reporting message and cause the reporting message to be transmitted by the antenna couple to the front-end module circuitry.

Example 13 is one or more computer-readable media having instructions that, when executed, cause one or more processors of a user equipment (UE) to: decode a downlink control information (DCI) message received at the UE from a network; determine a reporting mode for the UE based on the DCI; generate a channel state information (CSI) reporting message based on the determined reporting mode; and encode extra-large physical uplink control channel (xPUCCH) data including the reporting message.

In Example 14, in the one or more computer-readable media of example 13, or any of the examples described herein, to cause the processors to cause the CSI reporting message to be transmit to the network, the instructions are further to cause the processors to cause the reporting message to transmit on a sub-frame on which the DCI is decoded.

In Example 15, in the one or more computer-readable media of example 13, or any of the examples described herein to generate the CSI reporting message, the instructions are further to cause the processors to generate a channel quality indicator (CQI) report comprising one or more of a precoding matrix indicator (PMI), a rank indicator (RI), a beam index (BI), or a channel quality indicator (CQI).

In Example 16, in the one or more computer-readable media of example 13, or any of the examples described herein to generate the CSI reporting message, the instructions are further to cause the processors to generate a beam quality indicator (BQI) report comprising one or more of a beam reference signal identifier (BRSID) or a beam quality indicator (BQI).

In Example 17, in the one or more computer-readable media of example 13, or any of the examples described herein, to cause the UE determine a reporting mode for the UE based on the DCI, the instructions are further to cause the processors to determine a number of CQI values to report and a number of BQI values to report.

In Example 18, in the one or more computer-readable media of example 13, or any of the examples described herein, the instructions are further to cause the processors to generate additional CSI reporting messages periodically to be transmit to the network.

Example 19 is an apparatus of a UE comprising: means for decoding a message received at the UE from a network to determine a reporting mode for the UE; means for generating a channel state information (CSI) reporting message based on the determined reporting mode; and means for causing the reporting message to be transmit to the network over an extra-large physical uplink control channel (xPUCCH).

In Example 20, the apparatus of example 19, or any of the examples described herein, further comprises means for determining at least one of a channel quality indicator (CQI) or a beam quality indicator (BQI) based on measurement of signal strength of a signal received by the UE.

In Example 21, the apparatus of example 19, or any of the examples described herein, further comprises means for determining the reporting mode based on a number of CQI values to report and a number of BQI values to report indicated in the decoded message.

In Example 22, the apparatus of example 19, or any of the examples described herein, further comprises means for generating a channel quality indicator (CQI) report comprising one or more of a precoding matrix indicator (PMI), a rank indicator (RI), a beam index (BI), or a channel quality indicator (CQI).

In Example 23, the apparatus of example 19, or any of the examples described herein, further comprises means for generating a beam quality indicator (BQI) report comprising one or more of a beam reference signal identifier (BRSID) or a beam quality indicator (BQI).

In Example 24, the apparatus of example 19, or any of the examples described herein, further comprises means for transmitting the CSI reporting message to the network.

In Example 25, the apparatus of example 19, or any of the examples described herein, further comprises means for measuring signal strength of a beam received at the UE from the network.

Example 26 is a method comprising: decoding a downlink control information (DCI) message received at the UE from a network; determining a reporting mode for the UE based on the DCI; generating a channel state information (CSI) reporting message based on the determined reporting mode; and encoding extra-large physical uplink control channel (xPUCCH) data including the reporting message.

In example 27, in the method of example 26, or any of the examples described herein, encoding the xPUCCH data further comprises transmitting on a sub-frame on which the DCI is decoded.

In example 28, in the method of example 26, or any of the examples described herein, generating the CSI reporting message, further comprises generating a channel quality indicator (CQI) report comprising one or more of a precoding matrix indicator (PMI), a rank indicator (RI), a beam index (BI), or a channel quality indicator (CQI).

In example 29, in the method of example 26, or any of the examples described herein, generating the CSI reporting message, further comprises generating a beam quality indicator (BQI) report comprising one or more of a beam reference signal identifier (BRSID) or a beam quality indicator (BQI).

In example 30, in the method of example 26, or any of the examples described herein, determining a reporting mode for the UE based on the DCI further comprises determining a number of CQI values to report and a number of BQI values to report.

In example 31, the method of example 26, or any of the examples described herein, further comprises generating additional CSI reporting messages periodically to be transmit to the network.

Example 32 is an apparatus comprising means to perform a method as claimed in any of claims 26 to 31.

Example 33 is a machine-readable storage including machine-instructions that, when executed, cause an apparatus to perform a method as claimed in any of claims 26 to 31.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focuses on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" on "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus of a user equipment (UE), the apparatus comprising:
    a memory device; and
    one or more processors, operatively coupled to the memory device, to:
        determine a reporting mode for the UE based on a message received at the UE from an eNodeB;
        generate a channel state information (CSI) reporting message based on the reporting mode;
        encode extra-large physical uplink control channel (xPUCCH) data to include the CSI reporting message, wherein the CSI reporting message comprises a channel quality indicator (CQI) and at least one of a beam reference signal identifier (BRSID) or a beam quality indicator (BQI); and
        in response to determining that the reporting mode is a third mode, the one or more processors are further to:
            determine a first CQI value for a first beam index (BI) and a second CQI value for a second BI,
            determine a first BQI value for a first BRSID and a second BQI value for a second BRSID; and
            generate the CSI reporting message comprising the first CQI value, the second CQI value, the first BQI, and the second BQI value.

2. The apparatus of claim 1, wherein the message received at the UE comprises downlink control information (DCI) and wherein the one or more processors are to determine the reporting mode based on a reporting mode indicator included in the DCI.

3. The apparatus of claim 2, wherein the one or more processors are further to determine an uplink sub-frame for the CSI reporting message, the uplink sub-frame having an ordinal number corresponding to an ordinal number of a downlink sub-frame carrying the DCI.

4. The apparatus of claim 1, wherein the message received at the UE from the eNodeB comprises a high layer configuration message.

5. The apparatus of claim 1, wherein the CSI reporting message comprises a BI and a CQI report comprising the CQI based on at least one of a precoding matrix indicator (PMI) or a rank indicator (RI).

6. The apparatus of claim 1, wherein the CSI reporting message comprises a BQI report comprising the at least one of the BRSID or the BQI.

7. The apparatus of claim 1, wherein, in response to determining that the reporting mode is a first mode, the one or more processors are to:
   determine a wideband CQI value based for a BI;
   determine a wideband BQI value for a BRSID; and
   generate the CSI reporting message comprising the wideband CQI value and the wideband BQI value.

8. The apparatus of claim 1, wherein, in response to determining that the reporting mode is a second mode, the one or more processors are to:
   determine a first CQI value for a first BI and a second CQI value for a second BI;
   determine a BQI value for a BRSID; and
   generate the CSI reporting message comprising the first CQI value, the second CQI value, and the BQI value.

9. The apparatus of claim 1, wherein, in response to determining that the reporting mode is a fourth mode, the one or more processors are to:
   determine a CQI value for a BI;
   determine a first beam quality indicator (BQI) value for a first BRSID and a second BQI value for a second BRSID; and
   generate the CSI reporting message comprising the CQI value, the first BQI value, and the second BQI value.

10. The apparatus of claim 1, wherein to determine the reporting mode for the UE, the one or more processors are to determine a number of CQI values to report and a number of BQI values to report.

11. The apparatus of claim 1, further comprising:
   radio frequency (RF) circuitry coupled to the one or more processors;
   front-end module circuitry coupled to the RF circuitry; and
   an antenna coupled to the front-end module circuitry,
   wherein to cause the CSI reporting message to be transmitted over a xPUCCH, the one or more processors are to encode the CSI reporting message and cause the CSI reporting message to be transmitted by the antenna.

12. An apparatus of a user equipment (UE), the apparatus comprising:
   a memory device; and
   one or more processors, operatively coupled to the memory device, to:
      determine a reporting mode for the UE based on a message received at the UE from an eNodeB;
      generate a channel state information (CSI) reporting message based on the reporting mode; and
      encode extra-large physical uplink control channel (xPUCCH) data to include the CSI reporting message, wherein, in response to determining that the reporting mode is a third mode, the one or more processors are to:
         determine a first channel quality indicator (CQI) value for a first beam index (BI) and a second CQI value for a second BI;
         determine a first beam quality indicator (BQI) value for a first beam reference signal identifier (BRSID) and a second BQI value for a second BRSID; and
         generate the CSI reporting message comprising the first CQI value, the second CQI value, the first BQI value, and the second BQI value.

13. One or more non-transitory computer-readable media having instructions that, when executed, cause one or more processors of a user equipment (UE) to:
   decode a downlink control information (DCI) message received at the UE from a network;
   determine a reporting mode for the UE based on the DCI;
   generate a channel state information (CSI) reporting message based on the reporting mode;
   encode extra-large physical uplink control channel (xPUCCH) data including the CSI reporting message, wherein the CSI reporting message comprises a channel quality indicator (CQI) and at least one of a beam reference signal identifier (BRSID) or a beam quality indicator (BQI); and
   in response to determining that the reporting mode is a third mode, the one or more processors are further to:
      determine a first CQI value for a first beam index (BI) and a second CQI value for a second BI,
      determine a first BQI value for a first BRSID and a second BQI value for a second BRSID; and
      generate the CSI reporting message comprising the first CQI value, the second CQI value, the first BQI value, and the second BQI value.

14. The one or more non-transitory computer-readable media of claim 13, wherein one or more processors further to cause the CSI reporting message to be transmitted on a sub-frame on which the DCI is decoded.

15. The one or more non-transitory computer-readable media of claim 13, wherein the one or more processors are further to generate a CQI report comprising the CQI based at least one of a precoding matrix indicator (PMI) or a rank indicator (RI).

16. The one or more non-transitory computer-readable media of claim 13, wherein the one or more processors are further to generate a BQI report comprising the at least one of the BRSID or the BQI.

17. The one or more non-transitory computer-readable media of claim 13, wherein the one or more processors are further to determine a number of CQI values to report and a number of BQI values to report.

18. A method comprising:
   decoding a downlink control information (DCI) message received at a user equipment (UE) from a network;
   determining a reporting mode for the UE based on the DCI;
   generating a channel state information (CSI) reporting message based on the reporting mode;
   encoding extra-large physical uplink control channel (xPUCCH) data including the CSI reporting message, wherein the CSI reporting message comprises a channel quality indicator (CQI) and at least one of a beam reference signal identifier (BRSID) or a beam quality indicator (BQI); and
   in response to determining that the reporting mode is a third mode,
      determining a first CQI value for a first BI and a second CQI value for a second BI;
      determining a first BQI value for a first BRSID and a second BQI value for a second BRSID; and
      generating the CSI reporting message comprising the first CQI value, the second CQI value, the first BQI value, and the second BQI value.

19. The method of claim 18, wherein further comprising transmitting the xPUCCH data including the CSI reporting message on a sub-frame on which the DCI is decoded.

20. The method of claim 18, wherein generating the CSI reporting message further comprises generating a CQI report comprising the CQI based on at least one of a precoding matrix indicator (PMI) or a rank indicator (RI), a BI, or a CQI.

* * * * *